US007603655B1

(12) United States Patent
Heifets et al.

(10) Patent No.: US 7,603,655 B1
(45) Date of Patent: Oct. 13, 2009

(54) METHOD FOR DYNAMICALLY STREAMING AN XSLT TRANSFORMATION

(75) Inventors: Abraham Heifets, Toronto (CA); Moshe Morris Emanuel Matsa, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,207

(22) Filed: Mar. 31, 2008

(51) Int. Cl.
*G06F 9/44* (2006.01)
*G06F 15/16* (2006.01)
(52) U.S. Cl. ............... 717/106; 709/231; 709/232
(58) Field of Classification Search ............ 717/100, 717/106–109; 709/231, 232
See application file for complete search history.

(56) References Cited

U.S. PATENT DOCUMENTS

| 5,317,736 | A | 5/1994 | Bowen ..................... 395/600 |
| 6,507,857 | B1* | 1/2003 | Yalcinalp .................. 715/235 |
| 7,111,076 | B2* | 9/2006 | Abjanic et al. ............. 709/246 |
| 7,165,239 | B2 | 1/2007 | Hejlsberg et al. ........... 717/114 |
| 7,328,403 | B2* | 2/2008 | Ramarao et al. ............ 715/236 |
| 7,392,239 | B2* | 6/2008 | Fontoura et al. ............... 707/3 |
| 7,458,022 | B2* | 11/2008 | Ramarao .................... 715/236 |
| 2004/0034830 | A1 | 2/2004 | Fuchs et al. ............. 715/501.1 |
| 2005/0086584 | A1* | 4/2005 | Sampathkumar et al. . 715/501.1 |
| 2005/0273772 | A1 | 12/2005 | Matsakis et al. ........... 717/136 |

OTHER PUBLICATIONS

Bar-Yossef et al., "On the Memory Requirements of XPath Evaluation over XML Streams," Jun. 2004, ACM, p. 177-188.*
Gou et al., "Efficient Algorithms for Evaluating XPath over Streams," Jun. 2007, ACM, p. 269-280.*
Dvorakova, Jana, "Automatic Streaming Processing of XSLT Transformations Based on Tree Transducers," Mar. 2008, p. 373-382.*
Dvorakova et al., "Using Input Buffers for Streaming XSLT Processing," <Date Unknown>.*
Schmidt et al., "Combined Static and Dynamic Analysis for Effective Buffer Minimization in Streaming XQuery Evaluation" Saarland University Database Group, Germany Data Engineering, 2007. ICDE 2007. IEEE 23rd International Conference on Apr. 15-20, 2007; pp. 236-245.

(Continued)

*Primary Examiner*—Wei Y Zhen
*Assistant Examiner*—Qing Chen
(74) *Attorney, Agent, or Firm*—Zilka-Kotab, PC

(57) ABSTRACT

A method in one embodiment includes receiving an XSLT transformation; analyzing the transformation for determining which information about the input is required to generate code that is streaming with respect to the rest of the input; calculating an algorithm which when given the required input information will then execute the entire XSLT transform in a streaming fashion; and generating code for computing the information about the input that is required for the calculated streaming algorithm while simultaneously buffering all incoming input data; storing the generated code; receiving incoming input data; running the generated code for computing the information that is required for the calculated streaming algorithm while simultaneously buffering incoming data; and once the required information has been computed: replaying the buffered data through the calculated streaming algorithm in a streaming manner; and finishing any remaining input through the calculated streaming version of the input algorithm in a streaming manner.

1 Claim, 2 Drawing Sheets

OTHER PUBLICATIONS

Quin, Liam, "Alternate Team Contact for the XSL Working Group: Extensible Stylesheet Language Family (XSL)" http://www.w3.org/style/xsl/; W3C Architecture Domain; p. 1-5; Mar. 31, 2008.

"Extensible Stylesheet Language Transformations (XSLT)" http://www.ibm.com/develperworks/xml/standards/x-xsltspec.html; IBM; p. 1-3; Feb. 6, 2007; updated Apr. 25, 2007.

* cited by examiner

METHOD FOR DYNAMICALLY STREAMING AN XSLT TRANSFORMATION

BACKGROUND

The present invention relates to streaming data, and more particularly, this invention relates to optimizing the streaming of data.

Many organizations, including banks, healthcare providers, and users of web services and service oriented architectures, process large data sets in documents that are several gigabytes or larger. Often, these documents do not fit into memory on computer systems and, on many computer systems, even where enough storage is available, access to such documents is very slow.

SUMMARY

A method in one embodiment includes receiving an extensible stylesheet language transformations (XSLT) transformation; analyzing the transformation for determining which information about the input is required to generate code that is streaming with respect to the rest of the input; calculating an algorithm which, when given the required streaming-enabling information, will then execute the entire XSLT transform in a streaming fashion; and generating code for: computing the information about the input that is required for the calculated streaming algorithm while simultaneously buffering all incoming input data. The method further includes storing the generated code; receiving incoming input data; running the generated code for computing the input information that is required for the calculated streaming algorithm while simultaneously buffering incoming data; and once the required information has been computed: replaying the buffered data through the calculated streaming algorithm in a streaming manner; and finishing any remaining input through the calculated streaming version of the input algorithm in a streaming manner.

Other aspects, advantages and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method comprises receiving an XSLT transformation; analyzing the transformation for determining which information about the input is required to generate code that is streaming with respect to the rest of the input; calculating an algorithm which given the required input information will then execute the entire XSLT transform in a streaming fashion; and generating code for: computing the information about the input that enables the use of the calculated streaming algorithm while simultaneously buffering all incoming input data. The method further includes storing the generated code; receiving incoming input data; running the generated code for computing the input information that is required for the calculated streaming algorithm while simultaneously buffering incoming data; and once the required information has been computed: replaying the buffered data through the calculated streaming algorithm in a streaming manner; and finishing any remaining input through the calculated streaming version of the input algorithm in a streaming manner.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1A:
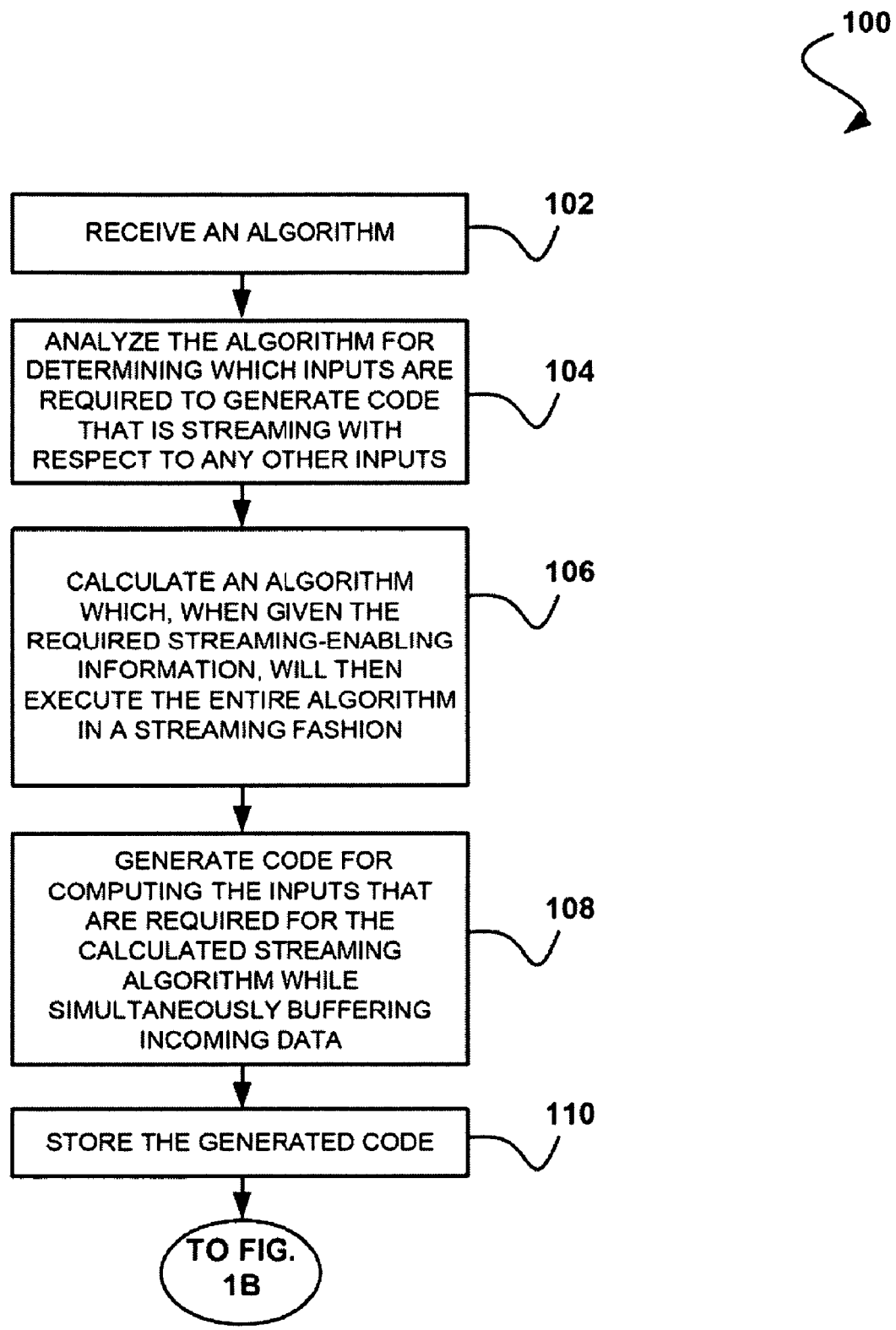
FIGS. 1A-1B show a method for dynamically streaming an algorithm, in accordance with one embodiment.
Figure 1B:
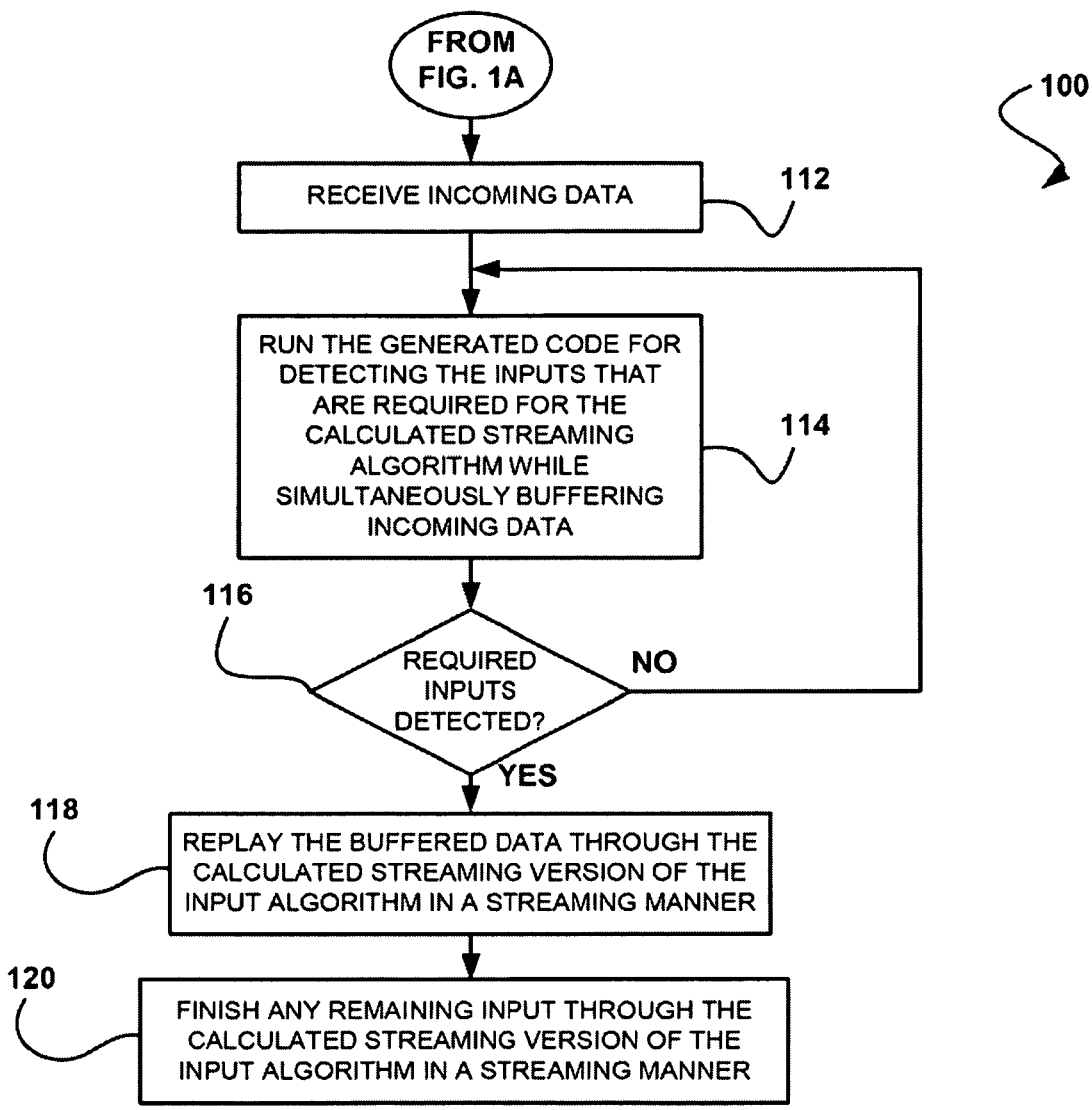

FIGS. 1A-1B show a method 100 for dynamically streaming an algorithm, in accordance with one embodiment. As shown in FIG. 1A, an algorithm such as an XSLT transformation is received. See operation 102. Additionally, the algorithm is analyzed for determining which inputs are required to generate code that is streaming with respect to any other inputs. See operation 104.

Furthermore, an input algorithm is calculated in a streaming fashion with respect to any other inputs. Preferably, an algorithm is calculated which, when given the required streaming-enabling information, will then execute the entire XSLT transform in a streaming fashion. See operation 106. In addition, code is generated for computing the inputs that are required for the calculated streaming algorithm while simultaneously buffering incoming data. See operation 108.

Further, the generated code is stored. See operation 110. Additionally, as shown in FIG. 1B, incoming data is received. See operation 112. Still yet, the generated code is executed for detecting the inputs that are required for the calculated streaming algorithm while simultaneously buffering incoming data. See operation 114. Note that the calculated streaming algorithm may take the detected information as its initial input.

Once the required inputs have been detected, and the required computation performed, the buffered data is replayed through the calculated streaming version of the input algorithm in a streaming manner and any remaining input is also processed as it is received by the calculated streaming version of the input algorithm. See operations 116, 118, and 120.

In "static" streaming implementations, the processing algorithm of an associated input document is analyzed ahead of time (e.g. at compile time, or system configuration time) to determine streamability, and the processing algorithm is transformed to operate over small, briefly-retained pieces of the input document. Unfortunately, the analysis that can be performed statically, at compile time, is typically extremely conservative because the transformations must be safe for any input document presented at runtime. Since many processing languages often do not specify an ordering on relevant portions of the input document [e.g. extensible stylesheet language transformations (XSLT)], it is difficult to inform the compiler about optimization opportunities for streaming based on the expected shape of the input data.

On the other hand, dynamic streaming, as discussed with respect to the method 100, provides for streaming or nearly-streaming performance and memory characteristics, even when static streaming is not possible. With dynamic streaming, an analysis pass may determine that if certain input is received, then static streaming will not be possible, but given a little more of the input then static streaming would be possible. Thus, code may be generated or configured such that when the data is received, the input data will be buffered and processed, in parallel, until the appropriate streaming path can be determined. Subsequently, the program may back up and process the buffered data in a streaming manner.

For further explanation, two examples of dynamic streaming may be considered. The first example occurs within XSLT processing. In one case, an XML document may contain sibling HEADER and BODY elements, as in a SOAP message. In one common scenario, an XSLT stylesheet might process the BODY element differently, depending on the contents of the HEADER. Typically, HEADERs are small compared to BODY elements and, if the HEADER came first in the XML document, the BODY may be processed in a streaming fashion. Unfortunately, XSLT provides no general mechanism to specify the order of elements in an input document. Thus, given most XSLT transformations, it will be unclear whether an input document might have the HEADER element after the BODY, and therefore a static XSLT compiler would generate a transform that requires the buffering of both elements.

In one embodiment, dynamic streaming may be implemented such that two code paths are generated, one which assumes the HEADER will be first and stream the processing of the BODY element, and the other which buffers both the HEADER and BODY elements. The decision as to which path to execute may be delayed until runtime, when one of these elements is encountered and it may be determined which code path is appropriate. Note that these dual-code paths may be generated at a plurality of points in the generated transformation code, and even recursively inside code paths that are themselves speculative in the same manner of this invention.

As a second example, a process flow environment may be considered, where a message is received and it can not yet be determined which flow is to be executed. With dynamic streaming, an auxiliary streaming or non-streaming flow may be used to gather data to determine which flow should be executed. In the meantime, the input data may be buffered. When the decision of which flow is to be executed can be made, and it is determined that the processing flow may be streamed, then the processing flow may be streamed starting with the buffered data and continuing with the rest of the data in a streaming manner.

It should be noted that the method 100 may also be used to enable maximal use of specialized acceleration resources, such as hardware acceleration or specially tuned and purposed software, in addition to streaming. Moreover, all of this may be achieved without requiring that any auxiliary structural information, such as an XML schema or document type definition (DTD), be provided to describe the document structure.

Although, the XML schema or DTD information may be utilized if available, primary knowledge of a task may be derived from analysis of the application code being optimized. As such, the method 100 may be applicable to general XML processing tasks where the structure of the input document is not known at the time of optimization. Furthermore, fail-over code paths that handle any input may be generated, even if streaming is inappropriate. Additionally, this process may be applied for any input to an algorithm, not only XML.

It should be noted that any analysis may be accomplished either by a compiler at compile time, or by runtime code at configuration time. It should also be noted that, the invention can take the form of an embodiment containing both hardware and software elements. In one embodiment, the invention may be implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for dynamically streaming an extensible stylesheet language transformations (XSLT) transformation, comprising:
   receiving an XSLT transformation;
   analyzing the XSLT transformation for determining which information about an input is required to generate code that is streaming with respect to the rest of the input;
   calculating a streaming version of an input algorithm which when given the required information about the input will then execute the entire XSLT transformation in a streaming fashion;

generating code for:
  detecting the information about the input that is required for the calculated streaming version of the input algorithm while simultaneously buffering all incoming input data;
storing the generated code;
receiving incoming input data;
running the generated code for detecting the information about the input that is required for the calculated streaming version of the input algorithm while simultaneously buffering all incoming input data; and once the required information about the input has been detected:
  replaying the buffered all incoming input data through the calculated streaming version of the input algorithm in a streaming manner; and
  finishing any remaining input through the calculated streaming version of the input algorithm in a streaming manner.

\* \* \* \* \*